United States Patent
Willinger et al.

(10) Patent No.: US 8,397,678 B2
(45) Date of Patent: Mar. 19, 2013

(54) SMALL ANIMAL HABITAT

(75) Inventors: Jonathan Willinger, Tenafly, NJ (US); Ryan Rutherford, Rutherford, NJ (US); Peter Ragonetti, Brooklyn, NY (US)

(73) Assignee: J.W. Pet Company, Inc., Teterboro, NJ (US)

( * ) Notice: Subject to any disclaimer, the term of this patent is extended or adjusted under 35 U.S.C. 154(b) by 0 days.

(21) Appl. No.: 13/043,928

(22) Filed: Mar. 9, 2011

(65) Prior Publication Data

US 2011/0203527 A1 Aug. 25, 2011

Related U.S. Application Data

(63) Continuation-in-part of application No. 12/089,336, filed as application No. PCT/US2006/046080 on Dec. 1, 2006, application No. 13/043,928, which is a continuation-in-part of application No. 12/695,446, filed on Jan. 28, 2010.

(Continued)

(51) Int. Cl.
*A01K 29/00* (2006.01)
*A01K 1/03* (2006.01)

(52) U.S. Cl. .................. 119/707; 119/702; 119/452

(58) Field of Classification Search .................. 119/428, 119/429, 431, 452, 453, 454, 455, 456, 459, 119/461, 467, 472, 473, 474, 475, 482, 491, 119/493, 496, 497, 498, 499, 500, 700, 702, 119/705, 706, 707; D30/108, 160, 112, 119
See application file for complete search history.

(56) References Cited

U.S. PATENT DOCUMENTS

| | | | |
|---|---|---|---|
| 80,561 A | 8/1868 | Osborn | |
| 320,960 A | 6/1885 | Peirano | |
| 620,415 A | 2/1899 | Campbell | |
| 815,211 A | 3/1906 | Pattee et al. | |
| 1,399,577 A | 12/1921 | Riehl | |
| 1,632,380 A * | 6/1927 | Marcus | 119/467 |
| 2,499,470 A | 3/1950 | Duncan | |
| 3,195,505 A | 7/1965 | Hauth et al. | |
| 3,537,726 A | 11/1970 | Conover | |
| 3,682,477 A | 8/1972 | Harkins | |
| 3,718,342 A | 2/1973 | Freed | |
| 3,742,908 A * | 7/1973 | Merino | 119/455 |
| D231,371 S | 4/1974 | Willinger et al. | |
| D232,036 S | 7/1974 | Willinger, et. al. | |
| 3,865,082 A * | 2/1975 | Lovitz et al. | 119/452 |
| 3,869,119 A | 3/1975 | Oxley | |

(Continued)

OTHER PUBLICATIONS

United States Office Action dated Apr. 16, 2012, from corresponding U.S. Appl. No. 12/089,336.

(Continued)

*Primary Examiner* — T. Nguyen
(74) *Attorney, Agent, or Firm* — Katten Muchin Rosenman LLP

(57) ABSTRACT

A small animal habitat includes a base, a wall extension, and a roof that define an interior space. In the interior space, an animal entertainment device is positioned distal from the base and a platform is spaced from the base providing access to the entertainment device. A climbing structure permits access to the platform. A first animal traversable path from the base to the animal entertainment device includes a first substantially vertical climb and a first substantially horizontal traverse on the platform. A second animal traversable path from the base to the port includes the first substantially vertical climb, a second substantially horizontal traverse on the platform, and a second substantially vertical climb to a port in the roof.

18 Claims, 11 Drawing Sheets

Related U.S. Application Data

(60) Provisional application No. 60/741,253, filed on Dec. 1, 2005, provisional application No. 60/850,779, filed on Oct. 11, 2006, provisional application No. 61/150,546, filed on Feb. 6, 2009.

(56) References Cited

U.S. PATENT DOCUMENTS

| | | | | |
|---|---|---|---|---|
| D235,111 S | | 5/1975 | Lovitz et al. | |
| 3,994,262 A | * | 11/1976 | Suchowski et al. | 119/700 |
| 4,027,626 A | | 6/1977 | DeSousa | |
| 4,064,839 A | * | 12/1977 | Rodemeyer et al. | 119/452 |
| D246,914 S | * | 1/1978 | Dinnerstein et al. | D30/112 |
| 4,096,887 A | | 6/1978 | Streit | |
| 4,171,682 A | * | 10/1979 | Merino et al. | 119/475 |
| 4,386,787 A | | 6/1983 | Maplethorpe et al. | |
| 4,505,346 A | | 3/1985 | Mueller | |
| 4,699,601 A | | 10/1987 | Hershfeld | |
| 4,735,173 A | | 4/1988 | Dubreuil | |
| 4,890,827 A | | 1/1990 | Tottey | |
| 5,078,094 A | * | 1/1992 | Hoover | 119/707 |
| 5,092,269 A | * | 3/1992 | Phillips et al. | 119/452 |
| 5,186,122 A | * | 2/1993 | Phillips et al. | 119/474 |
| D335,554 S | | 5/1993 | Conner | |
| D347,913 S | | 6/1994 | Wellington et al. | |
| 5,572,955 A | | 11/1996 | Boshears | |
| 5,664,525 A | * | 9/1997 | Phillips et al. | 119/452 |
| 5,799,611 A | * | 9/1998 | Park | 119/248 |
| 5,881,676 A | * | 3/1999 | Brown et al. | 119/452 |
| D409,802 S | | 5/1999 | Baker et al. | |
| 5,921,204 A | | 7/1999 | Johnson | |
| 5,960,744 A | | 10/1999 | Rutman | |
| 5,964,189 A | * | 10/1999 | Northrop et al. | 119/482 |
| 6,044,799 A | * | 4/2000 | Tominaga | 119/472 |
| 6,062,171 A | * | 5/2000 | Tominaga | 119/455 |
| 6,067,939 A | * | 5/2000 | Tominaga | 119/500 |
| 6,074,305 A | | 6/2000 | Schnapp | |
| D430,708 S | * | 9/2000 | Lau | D30/108 |
| 6,123,047 A | * | 9/2000 | Sakai | 119/452 |
| D443,956 S | | 6/2001 | Rudnick | |
| 6,253,712 B1 | | 7/2001 | Johnson | |
| 6,405,682 B1 | | 6/2002 | Simon | |
| D484,284 S | | 12/2003 | Venson et al. | |
| 7,093,564 B1 | | 8/2006 | Plante et al. | |
| 7,363,879 B2 | | 4/2008 | Bonner et al. | |
| D597,264 S | | 7/2009 | Hsieh | |
| 7,584,720 B1 | | 9/2009 | Jackson | |
| D611,201 S | | 3/2010 | Jakubowski et al. | |
| D611,202 S | | 3/2010 | Jakubowski et al. | |
| D636,538 S | * | 4/2011 | Ragonetti et al. | D30/108 |
| 8,074,608 B1 | | 12/2011 | Smith | |
| 2005/0115516 A1 | * | 6/2005 | Marchioro | 119/705 |
| 2008/0230012 A1 | | 9/2008 | Woltmann et al. | |
| 2010/0206241 A1 | | 8/2010 | Ragonetti et al. | |
| 2011/0061603 A1 | | 3/2011 | Ragonetti et al. | |

OTHER PUBLICATIONS

United States Office Action dated Aug. 27, 2010, from the corresponding U.S. Appl. No. 29/363,347.
United States Office Action dated Sep. 28, 2010, from corresponding U.S. Appl. No. 29/363,347.
Talvet, P. Human Powered Elevator. [online]. Popular Science/Core 77.20 Oct. 2003. [Retrieved on Sep. 30, 2008]. Retrieved from the internet: <URL: http://www.core77.com/challenge/humanpower/pages/1925_2.htm>.
International Search Report dated Oct. 7, 2008 from the corresponding PCT/US2006/046080.
Written Opinion dated Oct. 7, 2008 from the corresponding PCT/US2006/046080.
International Preliminary Report on Patentability dated Oct. 28, 2008 from the corresponding PCT/US2006/046080.
U.S. Office Action dated Apr. 9, 2010, from the corresponding U.S. Appl. No. 12/089,336.
File History of U.S. Appl. No. 60/741,253 as of Apr. 26, 2011.
File History of U.S. Application No. PCT/US2006/046080 as of Apr. 26, 2011.
File History of U.S. Appl. No. 12/089,336 as of Apr. 26, 2011.
File History of U.S. Appl. No. 29/363,347 as of Apr. 26, 2011.
File History of U.S. Appl. No. 13/043,922 as of Apr. 26, 2011.
File History of U.S. Appl. No. 13/044,009 as of Apr. 26, 2011.
U.S. Office Action dated Dec. 16, 2010, from the corresponding U.S. Appl. No. 12/089,336.
Notice of Allowance dated Dec. 2, 2010, from the corresponding U.S. Appl. No. 29/363,347.
File History of U.S. Appl. No. 12/695,446 as of Apr. 26, 2011.
File History of U.S. Appl. No. 61/150,546 as of Apr. 26, 2011.

* cited by examiner

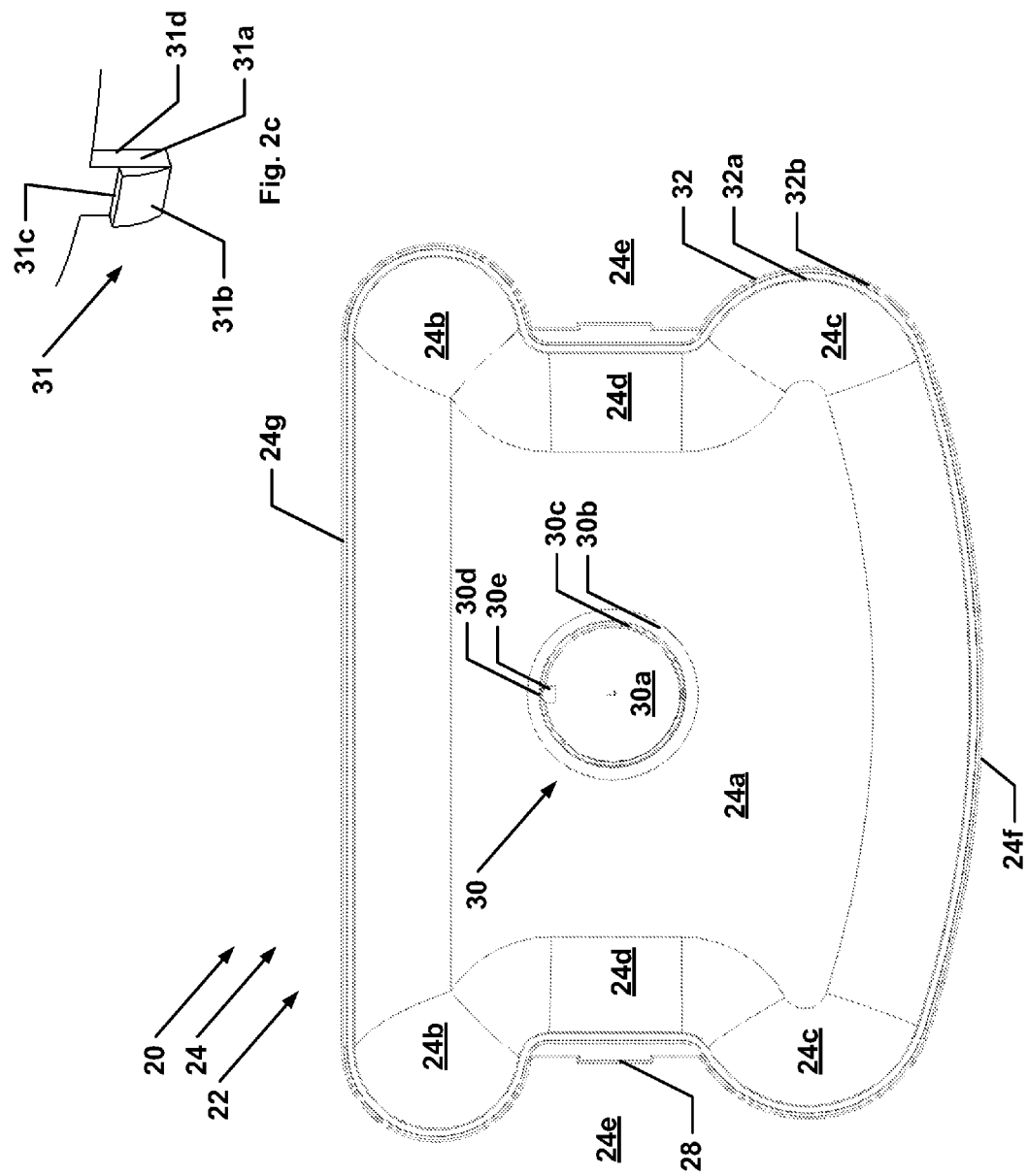

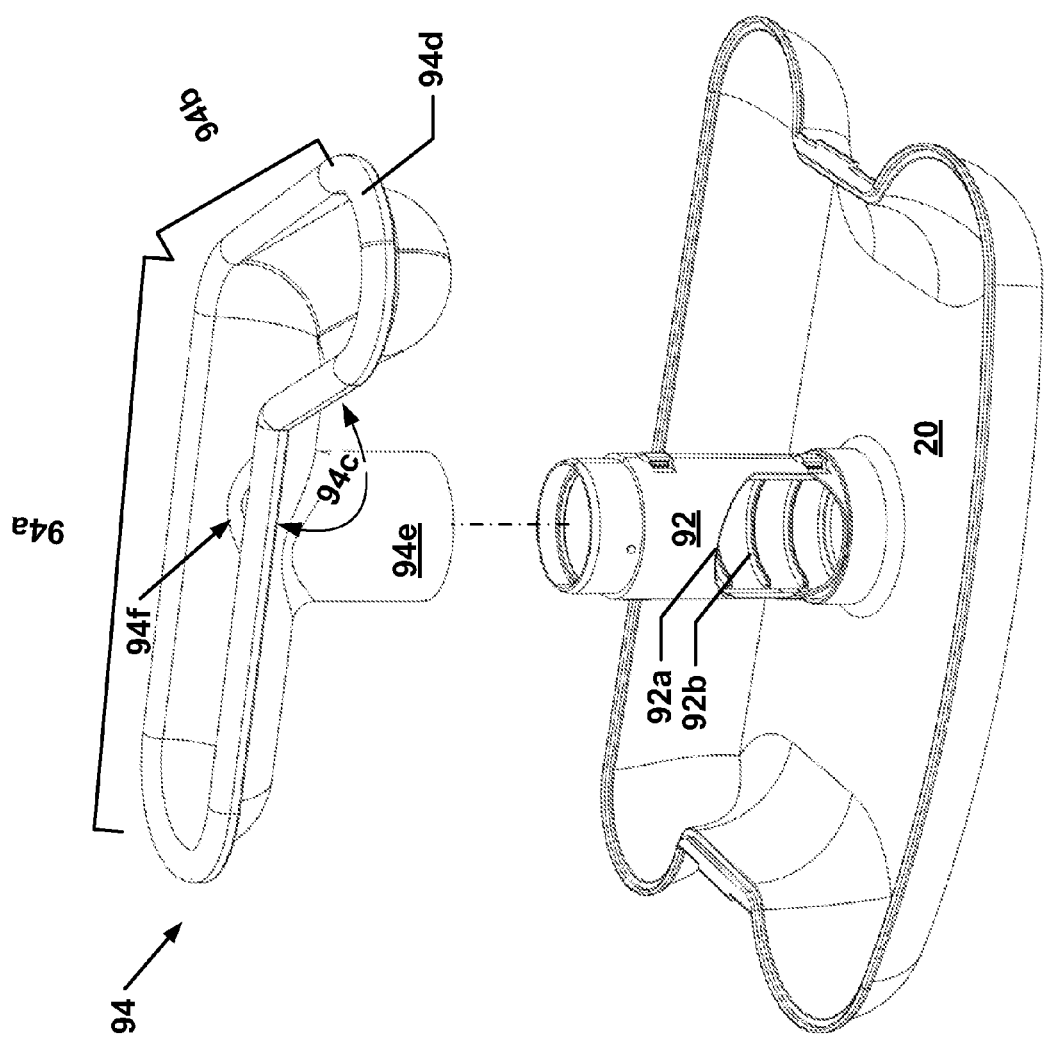

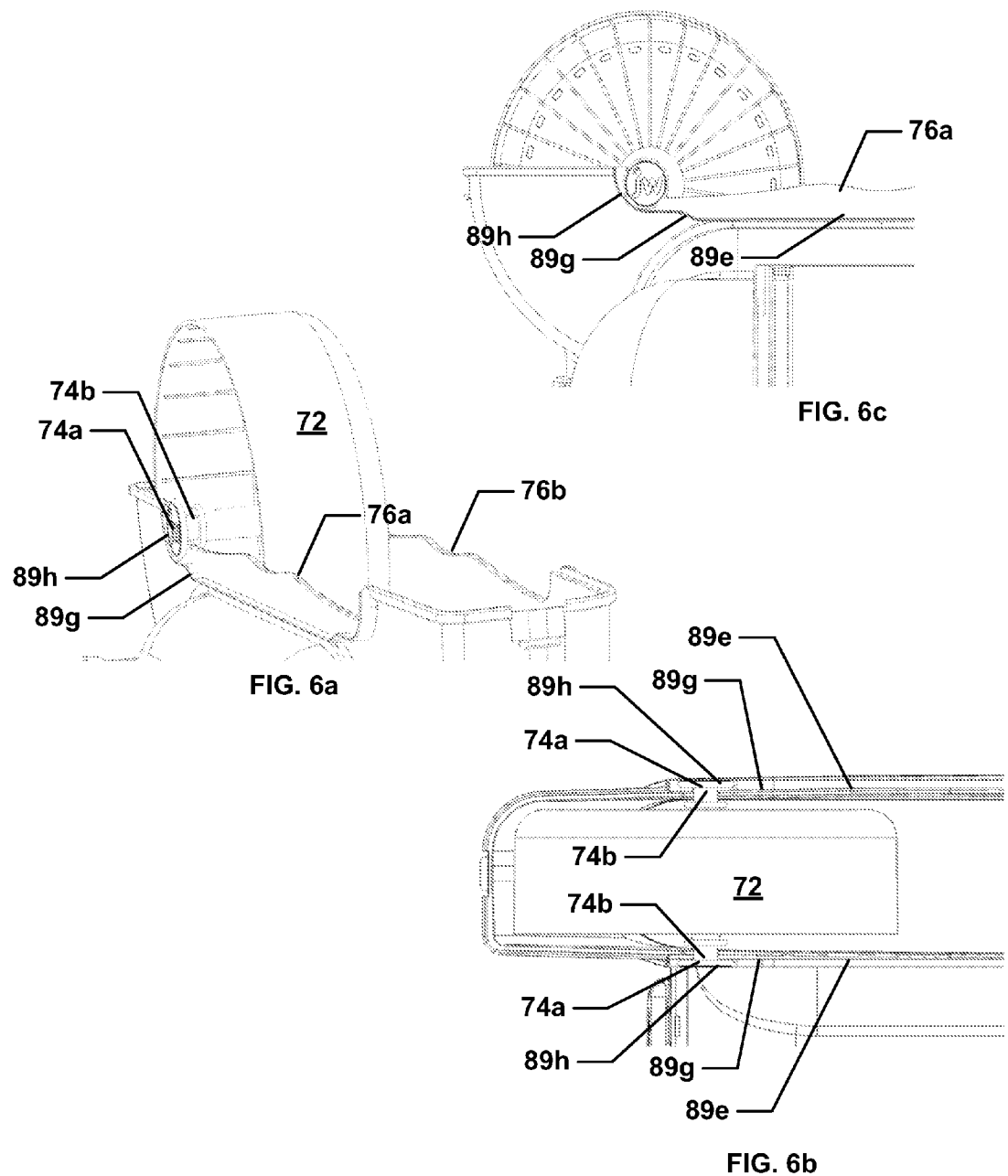

SMALL ANIMAL HABITAT

CROSS-REFERENCE TO RELATED APPLICATIONS

This application is a continuation-in-part of and claims priority to U.S. Ser. No. 12/089,336, which was filed Apr. 4, 2008 and which is pending, and which is hereby incorporated by reference in its entirety for all purposes.

U.S. Ser. No. 12/089,336 is a national filing of and claims priority via §371(c)(1) to PCT/US2006/046080, which was filed Dec. 1, 2006 and which is pending, and which is hereby incorporated by reference in its entirety for all purposes.

PCT/US2006/046080 is a non-provisional counterpart to and claims priority to U.S. Ser. No. 60/741,253, which was filed Oct. 11, 2006, and which is hereby incorporated by reference in its entirety for all purposes.

PCT/US2006/046080 is a non-provisional counterpart to and claims priority to U.S. Ser. No. 60/850,779, which was filed Feb. 6, 2009, and which is hereby incorporated by reference in its entirety for all purposes.

This application is a continuation-in-part of and claims priority to U.S. Ser. No. 12/695,446, which was filed Jan. 28, 2010 and which is pending, and which is hereby incorporated by reference in its entirety for all purposes.

U.S. Ser. No. 12/695,446 is a non-provisional counterpart to and claims priority to U.S. Ser. No. 61/150,546, which was filed Feb. 6, 2009, and which is hereby incorporated by reference in its entirety for all purposes.

BACKGROUND OF THE INVENTION

1. Field of the Invention

The invention generally relates to a habitat for keeping a small animal.

2. Discussion of the Related Art

Hamsters, mice, squirrels, gerbils and many other small animals that are kept as pets are typically housed in a cage, which by itself is not a stimulating environment. Thus, toys that provide stimulation and new experiences for small animals are highly desired. Preferably, such toys are designed so an animal can learn from its own instincts to utilize the toy. Therein, even more preferable is when a toy can be utilized by the animal in a basic function such as moving from one location to another. The present invention introduces an animal entertainment device in the form of a transport wheel, which allows a small animal to do exactly that, moving from a predetermined first location to a predetermined second location and vice versa and introduces a safe way for the animal to enter and exit on its own accord.

Wheels are for small animals are known; such wheels are commonly called exercise wheels. An exercise wheel allows a small animal to run full speed to its hearts' content and obtain exercise. However, depending on the type of wheel, the animal may be stuck at exactly the same place as where it started. Such stationary wheels are can be placed on a ground or suspended in a habitat cage. Most commercial exercise wheels marketed for small animals have rungs which are not suitable for them due to the fact that an animal can be injured. A stationary exercise wheel may not fully recreate a natural habitat of small animals because of its stationary nature becomes boring for the animal. Also, a viewer watching an animal running on a stationary wheel may become disinterested within a relatively short time.

Other kinds of exercise wheels—hamster balls or cars—are essentially closed balls configured to have an inner space, into which an animal is placed and then, by its own action, ends up in a random location of the house or yard. Since the interaction is random, the use of these toys requires supervision. Unsupervised pets can become trapped against furniture, trees or bushes and panic, or they can roll down stairs, injuring themselves.

A need exists of an improved small animal habitat having an entertainment device and a means to keep the animal safely enclosed in the small animal habitat.

SUMMARY OF THE INVENTION

These and other needs are met by the present invention.

An animal entertainment device includes an animal powered wheel that has a pair of axle ends, each axle end having a first and second circumferential wheel having different diameters and a pair of first rails and a pair of second rails. The first circumferential wheels engages the first pair of rails in a traversable portion of the first rails, the second circumferential wheels engages the second pair of rails in an end portion of the second rails to return the animal powered wheel to the traversable portion.

A small animal habitat includes a base, a wall extension, and a roof that define an interior space. In the interior space, an animal entertainment device is positioned distal from the base and a platform is spaced from the base providing access to the entertainment device. A climbing structure permits access to the platform.

A first animal traversable path from the base to the animal entertainment device includes a first substantially vertical climb and a first substantially horizontal traverse on the platform.

A second animal traversable path from the base to the port includes the first substantially vertical climb, a second substantially horizontal traverse on the platform, and a second substantially vertical climb to a port in the roof.

A locking system for a small animal habitat includes a latch having a strike member and a catch having a first and a second catch section. A portion of the strike member slides over at least on catch section to secure latch to the catch. An end of the strike member slides over the first catch section by the force of gravity.

A pet habitat includes a locking system having a latch having a strike member and a catch having a first and a second catch section. A portion of the strike member slides over at least on catch section to secure latch to the catch. An end of the strike member slides over the first catch section by the force of gravity.

When the pet habitat is placed in an open position when the top portion is hingedly moved away from the bottom portion and the top portion is released from the open position, the latch engages the catch so that the end of the strike member slides over the first catch section by the force of gravity.

BRIEF DESCRIPTION OF THE FIGURES

FIG. 2b is a plan view of the base of FIG. 2a.

FIG. 2c is a detail view of interlocking structure disposed on a modular unit used as climbing structure or climbing structure in accordance with one embodiment of the present invention.

FIG. 3a is a perspective view of a base, a climbing structure, and a platform in accordance with one embodiment of the present invention.

FIG. 5b is a plan view of the wheel and small animal habitat in FIG. 6a.

FIG. 6a is a perspective view of a wheel of the entertainment device spaced from a rail in order to prevent its further movement and direct the wheel to a traversable section of a portion of the small animal habitat of FIG. 1.

FIG. 6b is a plan view of the wheel and small animal habitat in FIG. 6a.

FIG. 6c is an elevational view of the wheel and small animal habitat in FIG. 6a.

DETAILED DESCRIPTION OF THE INVENTION

Figure 1:
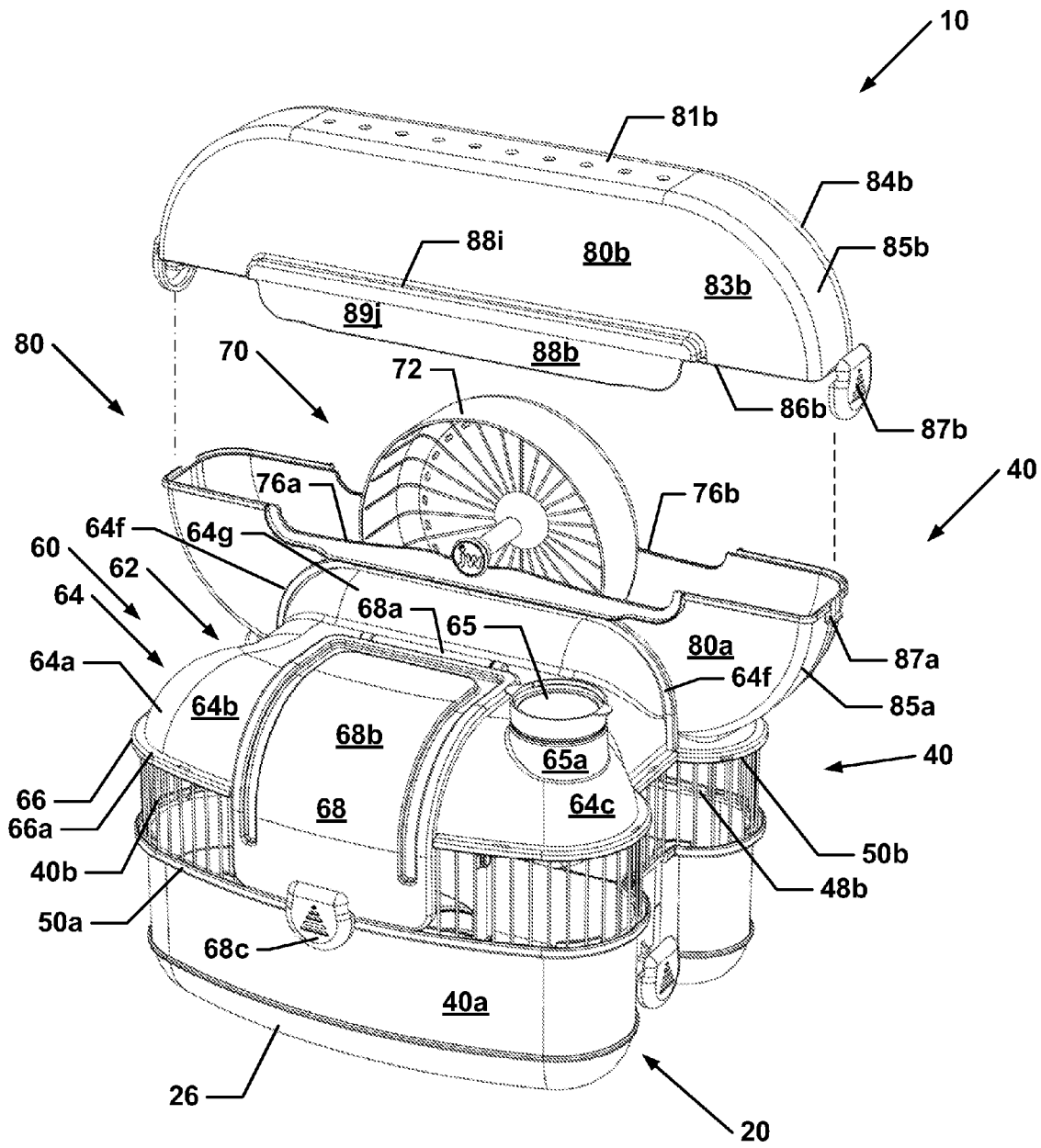
FIG. 1 is a perspective view small animal habitat in accordance with one embodiment of the present invention.

FIG. 1 is a perspective view small animal habitat in accordance with one embodiment of the present invention. Therein, a small animal habitat 10 is suitable for one or more small animals, such as one or more dwarf hamsters, Syrian hamsters, mice, gerbils, and/or the like ("resident animal"). If suitably scaled, small animal habitat 10 may be sued with other animals.

Small animal habitat 10 comprises a base 20, one or more extensions 40, a roof 60, an animal entertainment device 70, an entertainment housing 80, and optionally one or more accessories. Although, small animal habitat 10 is illustrated to have an advantageous doubled-winged shape in plan view that permits unobtrusive storage of a water and/or feed device as illustrated for example, in FIG. 8.

Figure 2A:
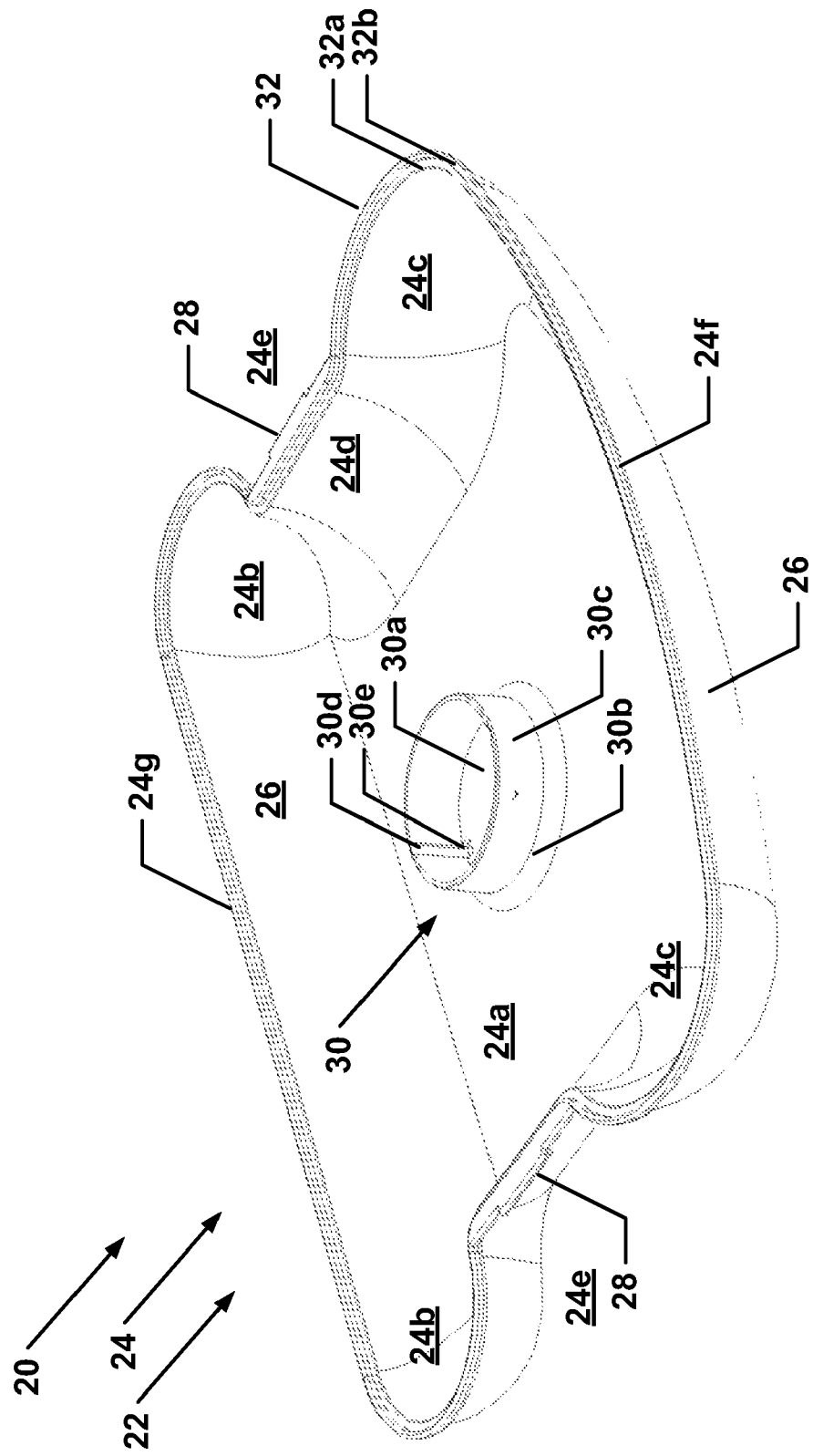
FIG. 2a is a perspective view of a base in accordance with one or more embodiments of the present invention.

FIG. 2a is a perspective view of a base in accordance with one or more embodiments of the present invention. FIG. 2b is a plan view of the base of FIG. 2a. FIG. 2c is a detail view of interlocking structure disposed on a modular unit used as climbing structure or climbing structure in accordance with one embodiment of the present invention.

Base 20 is preferably suitable for sitting on a support surface, such as a floor and preferably comprises a unitary structure 22 for stability, durability, ease of cleaning and/or ease of manufacturing. Therein, the base is preferably made by molding, including injection molding, and comprises a moldable material such as plastic or the like.

The base includes, when viewed in plan, a generally double-winged shape 24 having a substantially planar base portion 24a, a pair of first and second bulge portion 24b, 24c and a pair of recessed portions 24d located between bulge portions 24b, 24c and having a pair of opposed indentations 24e. The bulge portions form an-easy-to-clean base that is also easily handled via the recessed portions by a user by placing a hand under and/or along recessed portion 24d. Base 20 of shape 24 preferably includes a curved front edge 24f for maximum viewing enjoyment of and/or by the resident animal. A rear edge 24g of shape 24 is preferably linear to permit efficient placement against a wall, furniture and the like.

The base also may comprise one or more raised peripheral walls 26 to suitably prevent debris, scat, excess feed, and/or nesting material ("debris content") from being pushed off the base and/or suitably retain debris, scat, and/or nesting material in the small animal habitat 10. The raised peripheral walls are preferably unitarily molded with the other portions of the base and raise curvilinearly from planar base portion 24a in order to trap the debris content in the small animal habitat 10 by sliding any of the debris content that is pushed upwards by the actions of the resident animal or by intended or unintended movement of the habitat 10.

Base 20 comprises one or more receiving latch plates and/or catches 28 for joining one or more extensions 40 to the bases.

A retaining support 30 is disposed with the base to provide a stable foundation and retention for a climbing structure 92, such as one disclosed in U.S. Ser. No. 12/880,301, which is hereby incorporated by reference in its entirety for all purposes. Support 30 comprises a base portion 30a that preferably is a portion of planar base portion 24a delimited by a retainer 30b disposed to preferably peripherally enclose an outer or inner perimeter portion of climbing structure 92 (FIG. 3a). For stability, ease of manufacturing, or decorative qualities, a secondary retainer 30c adjoins all or a portion of an exterior of retainer 30b.

A guide 30d may be a portion of retainer 30b or adjacent thereto. Guide 30d may be an indentation in retainer 30b, a projection from retainer 30b, a combination of one or more indentations and/or one or more projections into and/or from retainer 30b, or any other suitable structure that helps secure and/or orient climbing structure 92 relative to retainer 30b.

Guide 30d may be associated with an interlocking feature that includes a receiving opening 30e in the base, i.e., preferably in base portion 30a and preferably adjacent to the periphery of retainer 30b to give an animal using the climbing structure as much use of base portion 30a as possible. A mating interlocking structure 31 is disposed on the periphery at a distal end of the climbing structure 92 (FIG. 3a). Interlocking structure 31 includes an extension 31a that is received in opening 30e. To prevent unintended dislocation of extension 31a from opening 30e, the extension comprises an enlarged tip 31b having an abrupt end 31c and/or a notch 31d.

Base 20 comprises a rim 32 that is disposed along all or a portion of a top periphery of base 20. Rim 32 comprises, when viewed in a cross-section, a flat edge receiving surface 32a and a wall 32b and one or more tabs or guides. Receiving surface 32a receives a portion of a lower rim and/or edge of a wire wall and/or a wall portion of one or more extensions 40. Therein, receiving surface 32a may have any suitable width, as determined along the cross-section of rim 32, and/or length. Wall 32b prevents unintended dislocation of the portion of the lower rim and/or edge of the wire wall and/or the wall portion of one or more extensions 40 relative to base 20. The tabs or guides help retain the one or more extensions 40 with respect to the base. Therein, wall 32b may have any suitable width, as determined along the cross-section of rim 32, and/or length and moreover height.

Preferably, rim 32 is cantilevered outwardly (i.e., away from the interior space of habitat 10) relative to a topmost portion of wall 26 so that an interior-most edge of receiving surface 32a is flush with a proximal interior portion of wall 26 providing a smooth easy to clean surface.

Figure 3B:
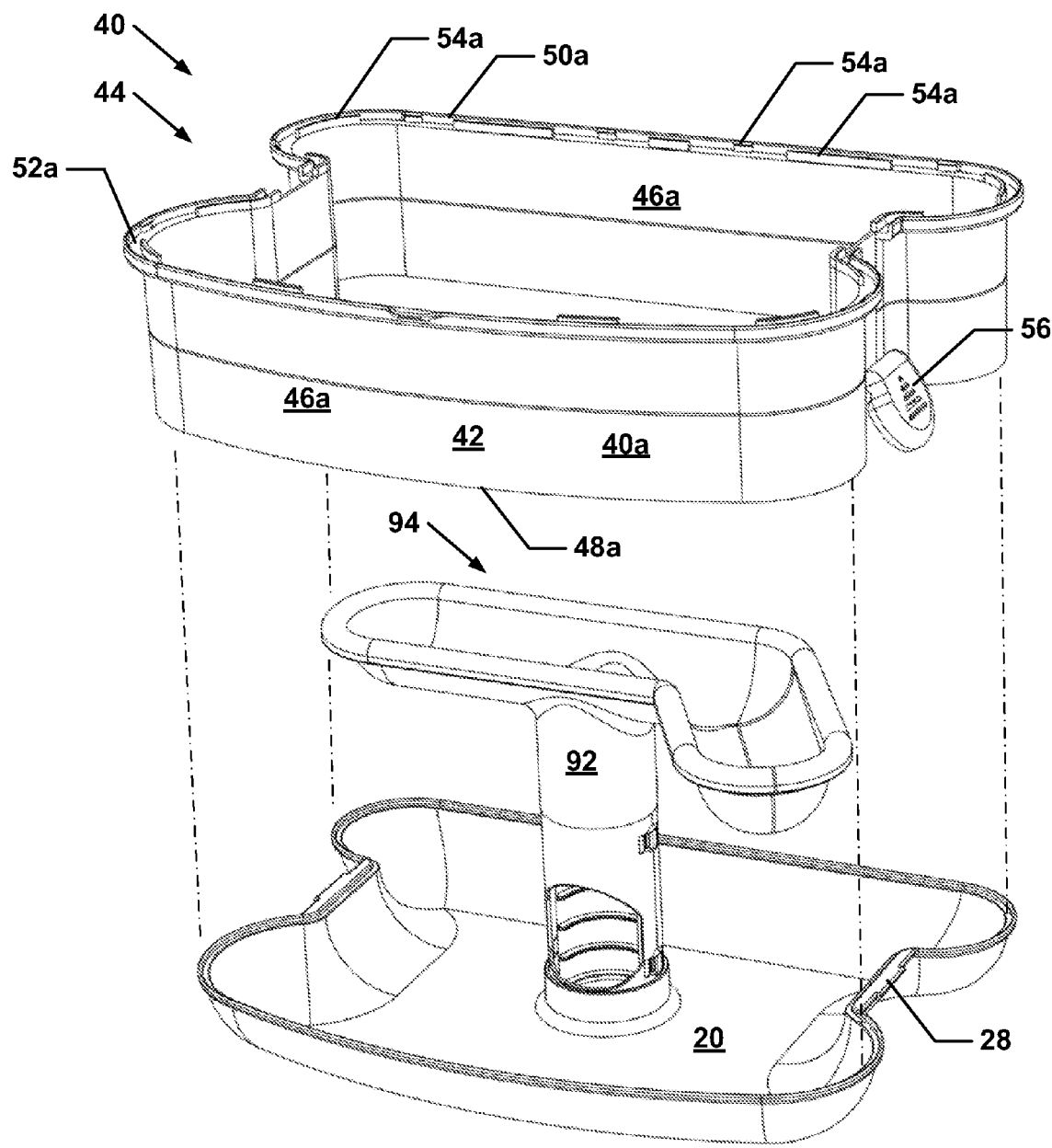
FIG. 3b is a perspective view of the base, the climbing structure, and the platform of FIG. 2a and an extension in accordance with one embodiment of the present invention.

FIG. 3a is a perspective view of a base, a climbing structure, and a platform in accordance with one embodiment of the present invention. FIG. 3b is a perspective view of the base, the climbing structure, and the platform of FIG. 2a and an extension in accordance with one embodiment of the present invention.

A climbing structure 92 preferably comprises an interlock structure 31 that locks into opening 30e. Climbing structure 92 comprises an opening 92a and a plurality of climbing rungs 92b.

A platform 94 may have a structure similar to that disclosed in U.S. Patent Publication 2010/0206241, which is hereby incorporated by reference in its entirety for all purposes. Platform 94 preferably has a substantially L-shaped section comprising section 94a and 94b wherein the two sections are angled respective to each other by an angle 94c by, for example, 135 degrees so that platform 94 may be used for the resident animal to reach both animal entertainment device 80 and one or more ports disposed in roof 60.

Platform 94 is preferably joined to climbing structure 92 such that the resident animal can securely climb and traverse both. Platform 94 is formed having a cross-sectional bathtub shape with a depression comprises a rounded peripheral edge 94d. A recessed band may be disposed at a stem portion 94e to mate with one or more indented bands 92a provided on the climbing structure 92. An opening 94f is disposed in the platform to provide access.

Figure 4:
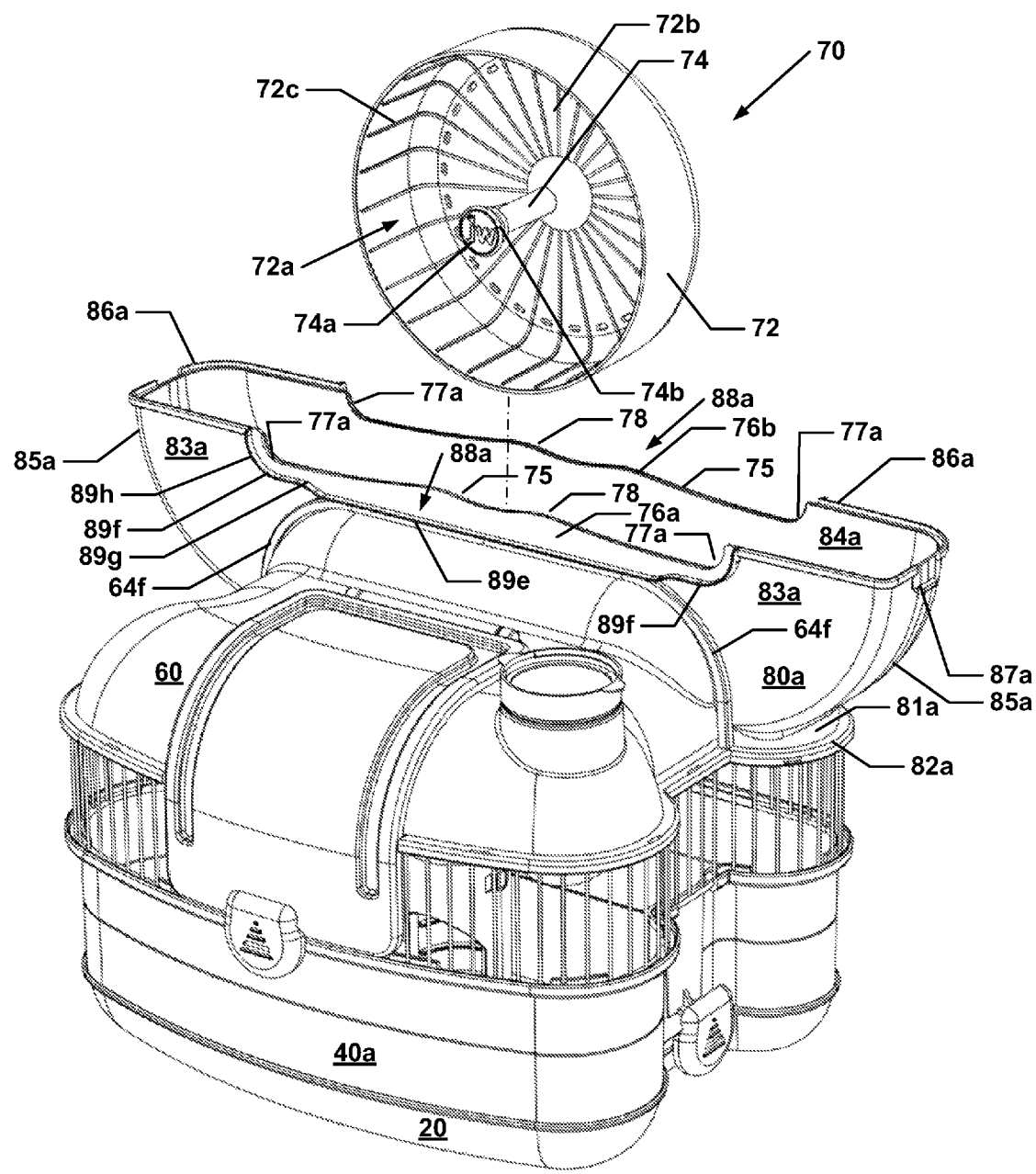
FIG. 4 is a perspective view of the small animal habitat of FIG. 1 wherein a housing portion has been removed and the entertainment device is shown in a removed position.

FIG. 4 is a perspective view of the small animal habitat of FIG. 1 wherein a housing portion has been removed and the entertainment device is shown in a removed position.

One or more extensions 40 may be disposed on base 20 in order to provide a peripheral wall structure to habitat 10. Multiple extensions 40 may be joined vertically so that at least one extension is disposed on top of at least another extension and/or horizontally so that at least one extension is disposed side by side on the same peripheral level of base 20.

Extension 40 may comprise a unitary structure 42 for stability, durability, ease of cleaning and/or ease of manufacturing. Therein, extension 40 may be an extension 40a that is preferably made by molding, including injection molding, and comprises a moldable material such as plastic or the like. In addition thereto or instead, extension 40 may be an extension 40b comprising wirewalls. One or more extensions 40 may have individually or be joined to comprise a double-winged shape 44 substantially similar to shape 44 and having bulge portions, recesses, or indentations.

Each extension 40a preferably comprises a wall 46a and a lower rim 48a having a wall edge that comprises a flush end-wall portion, i.e., opposed inner and outer surface and a flat transverse surface the width connecting the inner and outer surfaces. When joined to base 20, rim 48a and preferably the transverse surface is disposed on at least a portion of receiving surface 32a.

Extension 40a also preferably comprises an upper rim 50a that includes a wall portion that is cantilevered outward from wall 46a with respect to the interior of the cage and thereby forms a receiving surface 52a that receives another extension 40a, 40b and/or other suitable cage part. One or more locking features, guides, and/or tabs 54a may be disposed on rim 50a retain the portion that is received on receiving surface 52a.

Extension 40b preferably comprises a lower rim 48b that comprises a portion of a wirewall, which may comprise a lower edge having a wire disposed longitudinally into which one or more other wires are framed orthogonally or at an angle relative to the lower edge wire. When joined to base 20, rim 48b and preferably the longitudinal wire is disposed on at least a portion of receiving surface 32a. Therein, one or more locking features, guides, and/or tabs 54a are preferably designed to receive lower rim 48b in a locking manner so that if an extension 40b is joined onto an extension 40a the two extensions are joined together so that they can be lifted out together for ease of maintenance.

Extension 40b preferably comprises an upper rim 50b that comprises a portion of a wirewall, which may comprise an upper edge having a wire disposed longitudinally into which one or more other wires are framed orthogonally or at an angle relative to the lower edge wire. When joined to another small animal habitat part, rim 50b and preferably the longitudinal wire is disposed on at least a portion of a receiving surface.

One or more extensions 40 may comprise a latch 56 for locking one or more small animal habitat parts together for modularity to allow user choice and for ease of maintenance. Latch 56 is secured to catch 28 on base 20 to secure extension 40 to the base or latch 56 is secured to a catch, such as one like catch 28, that is disposed on another extension 40 to secure the two extensions together.

Roof 60 preferably comprises a unitary structure 62 preferably matching in plan view the general shape of the base or any other suitable shape. Therein, roof 60 preferably includes a generally double winged shape 64 having one or more arced edge portions 64a, pairs of bulge portions 64b and 64c, one or more recess portions 64d, and a raised portion 64e. A longitudinal domed structure 64g corresponds to a traversable section of a rail as further described and substantially to a section 94a of a platform 94 so that the resident animal can easily climb from the platform into the entertainment wheel and vice versa without interference from the roof.

Roof 60 further includes one or more ports 65, a rim 66, and a door 68. Roof 60 may be made of plastic and/or may include a coloration.

One or more access ports 65 may be placed at intervals through the roof to provide access for one or more accessories 90. Port 65 is preferably formed as a circular opening with a circumferential wall 65a that extends above the portion of the roof surrounding the port. Wall 65a may have an indent and/or guide to ease the insertion or removal of a conduit associated with an accessory 90 that is joined to cage 10 via port 65.

Rim 66 is preferably disposed at a lower edge of roof 60 and includes a wall portion that is cantilevered outward from the roof with respect to the interior of the cage and thereby forms a receiving surface 66a that receives an upper edge of an extension 40 and/or other suitable cage part. One or more locking features, guides, and/or tabs 66b may be disposed on rim 66 to retain the portion that is received on receiving surface 66a.

Door 68 is preferably is joined to roof 40 via hinge 68a. Door 68 may comprise a design and is preferably shaped to conform to a general of the cage. For example, door 68 may comprise an arced section 68b. A latch 68c is disposed toward an edge portion of door 68 and in cooperation with a catch that is disposed on an extension secures the door shut during use.

Entertainment device 70 comprises a wheel 72 able to move by the power of the resident animal over a pair of rails 76a and 76b. Wheel 72 has an open side 72a and a substantially closed side 72b. Closed side 72b prevents the resident animal from unintended exit of the wheel. A plurality of ridges 72c is provided inside the wheel. As the animal runs on the wheel, the animal pushes against the ridges and causes the wheel to move.

Wheel 72 further comprises an axle 74 that has an opening at each onto which end caps 74a are disposed. A stem of end caps 74a fit into the axle and effectively length axle 74. Rubber gaskets 74b are disposed on the stem as a rubber runner. The rubber provides friction between and permits the wheel to rotate about an axis passing through the axle and provide the main traction with respect to the rail.

Rails 76a and 76b comprise one or more undulating shapes 78.

Entertainment housing 80 comprises a first housing portion 80a that may be integral with roof 60, for example, by being integrally molded, or that may be joined via seam or joint 64f to the roof and a second housing portion 80b that is removable from the first housing portion 80a. First housing portion 80a includes base wall portion 81a that and a lower rim portion 82a that has a structure substantially similar to rim 66 and functions like rim 66.

First housing portion 80a further includes one or more sidewall portions 83a and 84a that are spaced apart at a distance that permits entertainment wheel 72 to move between the sidewalls but prevents the resident animal from exiting the entertainment device. A pair of curved transverse walls 85a is disposed at respective ends of the first housing portion. Housing portion 80a includes an upper rim 86a having a cantilevered wall 86c and upstanding wall portion 86d that retains a lower edge 86b of second housing portion 80b. One or more catches 87a are disposed on first housing portion 80a.

First housing portion 80a preferably includes one or more recess medial portions 88a defining in general the limits of the traversable range of axle 74 with respect to the housing. One or more rails 76a for the entertainment device is a separate unit comprising metal and is secured in a groove in one of the medial portions 88a. Rail 76b is formed integral with the first housing portion in a second medial portion 88b. Therein, rail 76b is preferably configured as a portion of sidewall 84a. A wall 89e extends substantially orthogonally from respective sidewalls of first housing portion 80a and includes end portions 89f.

Figure 5A:
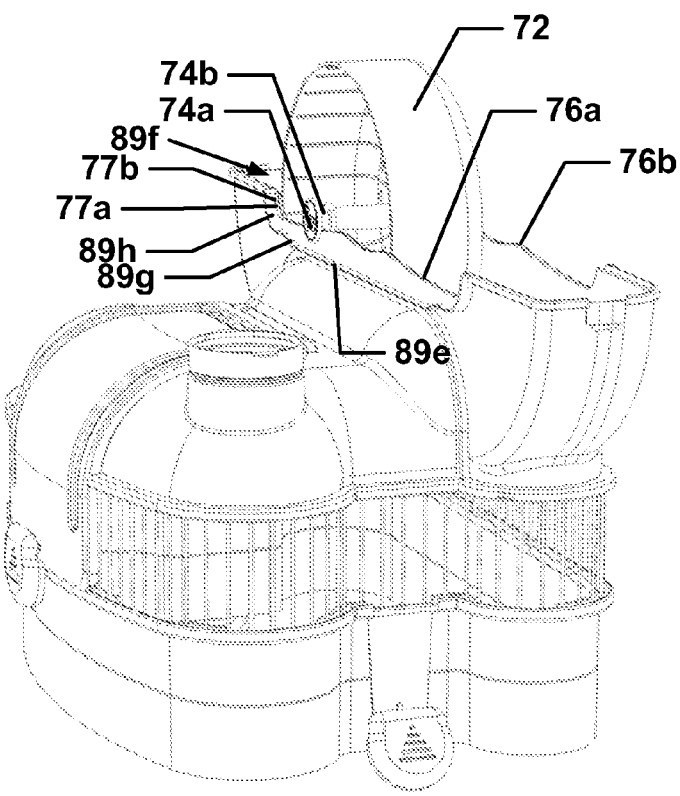
FIG. 5a is a perspective view of a wheel of the entertainment device traversing a rail in a portion of the small animal habitat of FIG. 1.
Figure 5B:
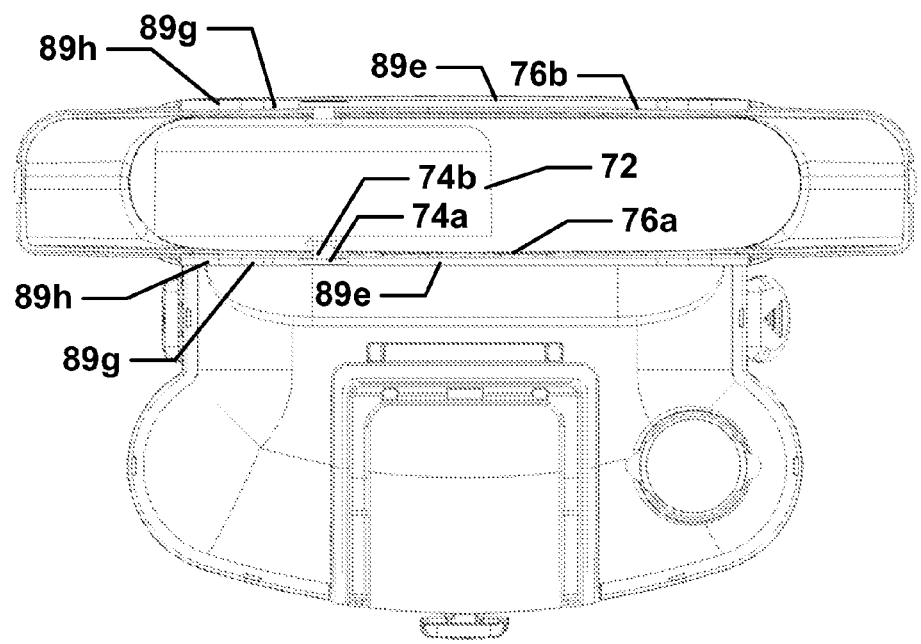

FIG. 5a is a perspective view of a wheel of the entertainment device traversing a rail in a portion of the small animal habitat of FIG. 1. FIG. 5b is a plan view of the wheel and small animal habitat in FIG. 6a.

FIG. 6a is a perspective view of a wheel of the entertainment device spaced from a rail in order to prevent its further movement and direct the wheel to a traversable section of a portion of the small animal habitat of FIG. 1. FIG. 6b is a plan view of the wheel and small animal habitat in FIG. 6a. FIG. 6c is an elevational view of the wheel and small animal habitat in FIG. 6a.

The wheel traverses rails 76a and 76b efficiently in a traversable section 75 of the rails extending between end portions 77a. At an incline 77b of end portions 77a, a circumferential edge of cap 74a contacts wall 89e lifting the wheel axle, i.e., the rubber runner from contact with respective rails 76a and 76b and spacing the rubber gasket 74b from the rail as shown in FIG. 7a.

The edge of cap 74a, e.g., the entire wheel, and incline 77b are made of materials that have a low constant of friction relative to each other. Thus, wheel 74 preferably slips on wall 89e in a section 89g. If the momentum of the moving wheel carries the wheel onto a respective arced portion 89h, arced portions 89h and preferably a corresponding arced end portion disposed on the rail prevent the wheel's motion and reverse its direction.

Second housing portion 80b comprises a roof portion 81b that may have one or more openings to permit air to get into the cage. Second housing portion 80b further includes one or more sidewall portions 83b and 84b that are spaced apart at a distance that permits entertainment device 60 to move between the sidewalls but prevents the resident animal from exiting the entertainment device and preferably match the spacing between sidewalls 83a and 84a. A pair of curved transverse walls 85b is disposed at respective ends of second housing portion 80b.

Housing portion 80b includes a lower edge portion 86b having one or more undulating portions opposite rails 76a and 76b The undulating portion has a shape that complements the undulating section of respective rail 76a or 76b, such that a constant space is maintained between the undulating portion and the undulating section of rail 76a or 76b. For example, when a dip is disposed in the rail, the undulating portion has a crest. One or more latches 87b are disposed on second housing portion 80b and cooperate with catches 87a to secure the first and second housing portions.

The rail end portions and the respective lower edge portion 86b cooperate as a return for automatically returning the animal powered wheel to the traversable portion. Each return comprises a rail end portion 77a disposed on a respective rail and a support end portion 89f disposed on a portion 89e of a housing. Therein, the animal powered wheel 72 comprises a pair of axle ends 74, each axle end comprising a first circumferential wheel surface 74b and a second circumferential wheel surface 74a, wherein the first circumferential wheel portion 74b engages the respective rail in the traversable portion. However, because the distance between edge 89e and the respective rail is decreased in the end portion 89f and end portion 77a, the second circumferential wheel portion 74a engages end portion 89f and lifts the portion 74b from the rail. Wheel portions 74a and 7b differ by a predetermined diameter distance. The difference between the top of the respective rail and edge portion 89e is more in the traversable portion, but is less in the end portions causing a switch from the use of one circumferential wheel portion to another and the automatic return described.

Second housing portion 80b also includes one or more medial portions 88b having a protective wall structures 89b that overlap medial portion 88a of first housing portion 80a where a rail for the entertainment device is located. Wall structure 89b preferably includes a wall 89i that extends outward from second housing portion 80b and an overlapping wall portion 89j spaced apart from rails 76a and 76b such that end cap 74a can move with play between the wall portion 89i but not become dislodged from wall 89e, i.e., walls 77a.

Advantageously, extensions 40, roof 60, and entertainment housing 80 are shipped disassembled with respect to each other. Once assembled, the locking features, guides, and/or tabs disposed on the respective rims lock these parts together forming a top portion of the small animal habitat that can be easily handled as a single unit for convenience of the resident animal's carer.

In use, the base of small animal habitat may be removed by opening the latches that connect the base to one or more extensions and lifting the top portion comprising one or more extensions 40, roof 60, and entertainment device 70, and entertainment housing 80 off the base. The base can then be separately cleaned and/or washed. By removing the second housing portion 80b, the wheel can be removed and cleaned separately from the top portion.

Figure 7:
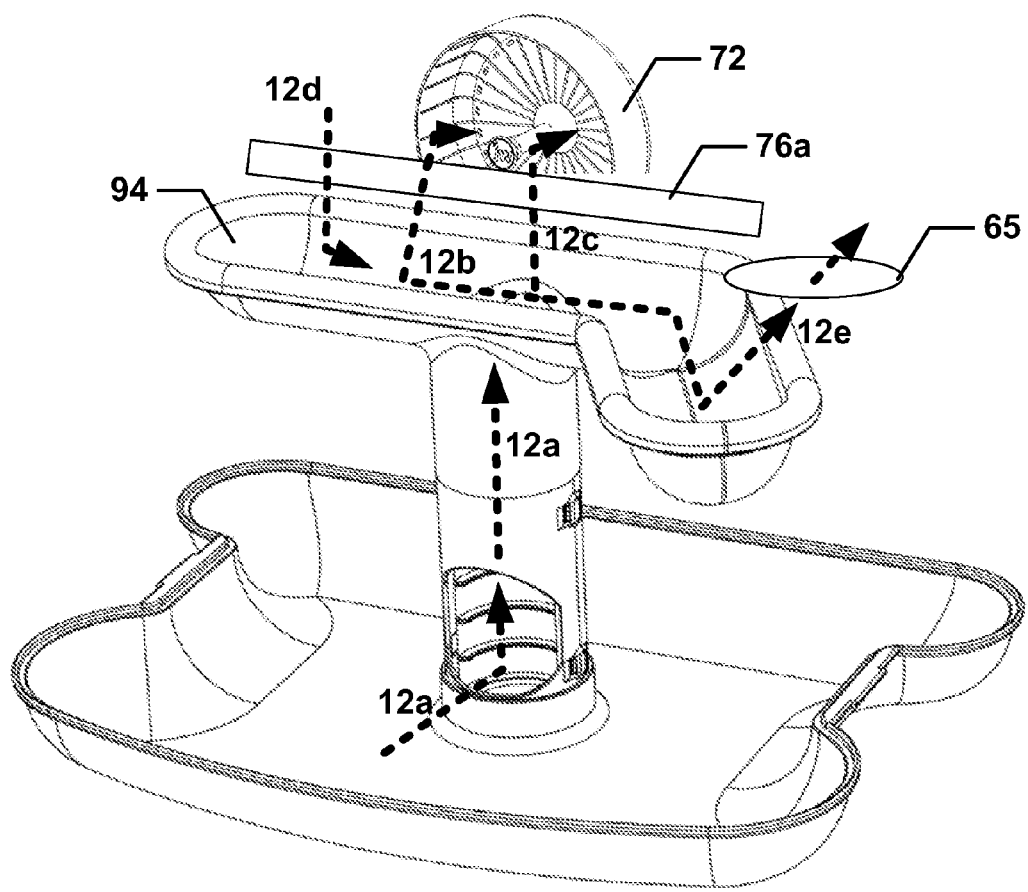
FIG. 7 is a schematic diagram of a plurality of animal traversable paths able to be taken by the resident animal accordance with one embodiment of the present invention.

FIG. 7 is a schematic diagram of a plurality of animal traversable paths able to be taken by the resident animal accordance with one embodiment of the present invention. When the resident animal wishes to enter the wheel, the animal can enter the climbing structure through opening 92a and climb to platform 94 using path 12a.

The animal then can climb over rail 76a and into wheel 72 via path 12b or 12c. The animal can then continue to turn the wheel and exit by returning at any point on platform 94a via a path 12d since the length conforms substantially to the traversable length of the rail. Therein, an animal traversable path from the base to the animal entertainment device includes the substantially vertical climb of path 12a and a substantially horizontal traverse 12b on the platform and a climb over an edge of the platform or the substantially vertical climb of path 12a and a climb over an edge of the platform 12c.

The animal can also take path 12e to a port wherein the substantially vertical climb of path 12a and a substantially horizontal traverse and substantially vertical climb 12e.

Figure 8:
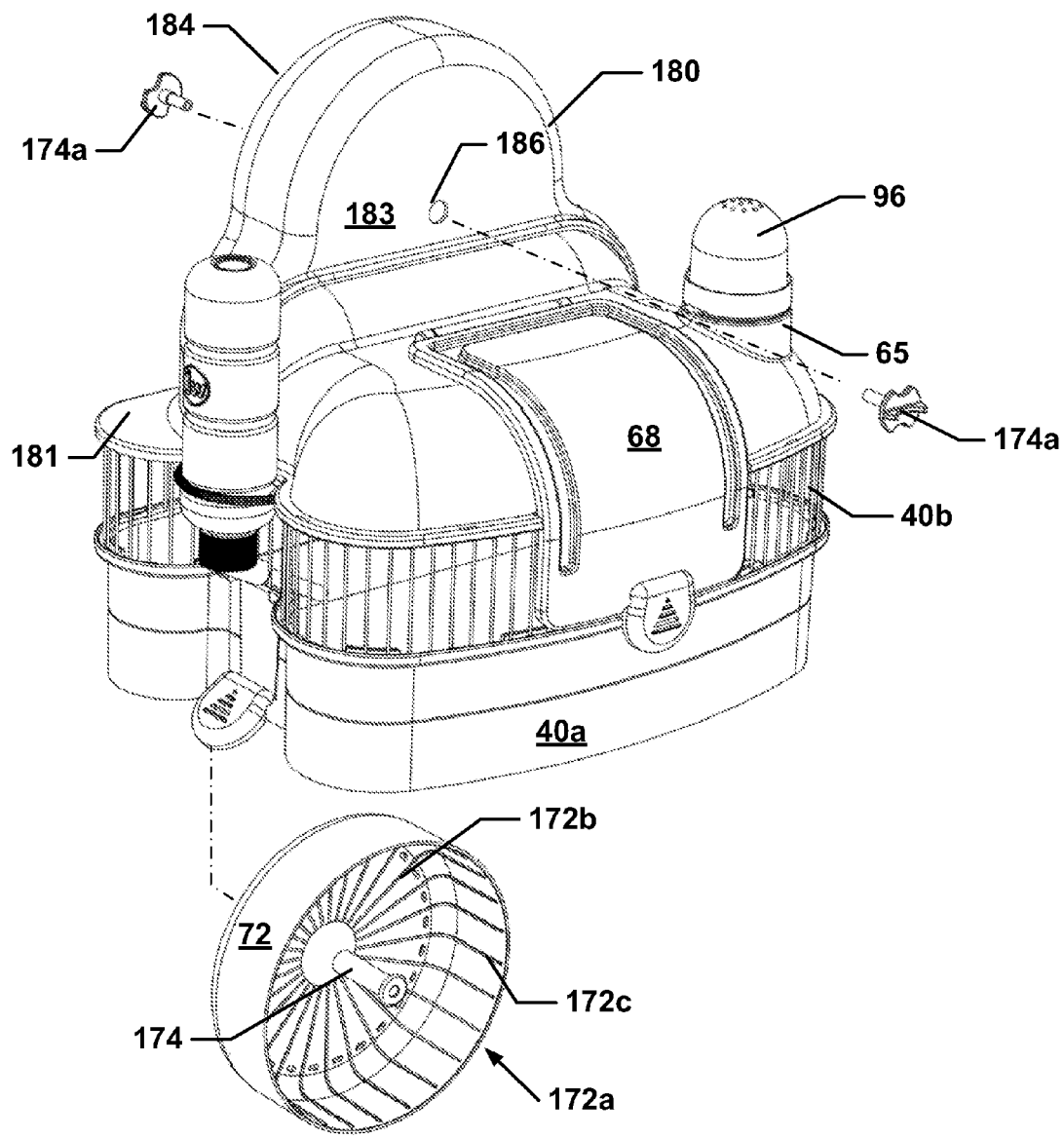
FIG. 8 is a perspective view of a top portion of a small animal habitat in accordance with one or more embodiments of the present invention.

FIG. 8 is a perspective view of a top portion of a small animal habitat in accordance with one or more embodiments of the present invention. A small animal habitat 100 is configured for the same purpose as small animal habitat 10 and includes a base (not shown), one or more extensions 40, i.e., extensions 40a and 40b but differs in that a roof 160, an animal entertainment device 170, an entertainment housing 180, and optionally one or more accessories 190 are provided.

Roof 160 preferably comprises a unitary structure 162 preferably matching in plan view the general shape of the base or any other suitable shape. Therein, roof 160 preferably includes a generally double winged shape. Roof 160 includes one or more ports 65, a rim 66, and a door 68. Roof 160 may be made of plastic and/or may include a coloration.

Entertainment device 170 comprises a wheel 172 able to rotate in a fixed location by the power of the resident animal. Wheel 172 is configured substantially identical to wheel 72 and has an open side 172a and a substantially closed side 172b. Closed side 172b prevents the resident animal from unintended exit of the wheel. A plurality of ridges 172c is provided inside the wheel. As the animal runs on the wheel, the animal pushes against the ridges and causes the wheel to rotate.

Wheel 172 further comprises an axle 174 that has an opening at each onto which end caps 174a are disposed. A stem of end caps 174a fit into the axle and effectively length axle 174.

Entertainment housing 180 comprises single portion that may be integral with roof 160, for example, by being integrally molded, or that may be joined via seam or joint 164 to the roof. Housing 180 includes base wall portion 181 that and a lower rim portion 182 that has a structure substantially similar to rim 66 and functions like rim 66.

Housing 180 further includes one or more sidewall portions 183 and 184 that are spaced apart at a distance that permits entertainment wheel 72 to move between the sidewalls but prevents the resident animal from exiting the entertainment device. A pair of curved transverse walls 185 is disposed at respective ends of the housing portion and spaced from the wheel such that the resident animal can only exit via the open side of the wheel and does not become wedged by between the wheel and the walls.

Housing 180 further comprises one or more pairs of openings 186 for receiving respective stems of end cap 174a and securing wheel 172 to housing 180.

Advantageously, extensions 40, roof 160, and entertainment housing 180 are shipped disassembled with respect to each other. Once assembled, the locking features, guides, and/or tabs disposed on the respective rims lock these together forming part of a top portion of the small animal habitat that can be easily handled as a single unit for convenience of the resident animal's carer.

In use, the base of small animal habitat may be removed by opening the latches that connect the base to one or more extensions and lifting a top portion comprising one or more extensions 40, roof 160, and entertainment device 170, and entertainment housing 180 off the base. The base can then be separately cleaned and/or washed. By removing end caps 174a, the wheel can be loosened and removed through the bottom of the top portion and cleaned separately from the top portion.

Accessories 90 may comprise a viewing dome 96 (FIG. 8) having a transparent or translucent top with openings for vents. Dome 96 is connected to the cage via one of the ports.

Accessories 90 may also comprise a loft 97. Loft 97 is strategically placed on top of small animal habitat 10 or 100. Loft 97 preferably comprises a top portion 97a, which preferably is dome shaped for ease of viewing outward by the resident animal and/or inward by the carer, and a bottom portion 97b having a floor 97c and an opening defined by stem 97d, which is used to connect the loft to the interior of the small animal habitat via a port. The top and bottom portions of the loft may be operably connected via a hinge 97e. Top portion 97a preferably has a one or more air access openings 97f. Stem 97d is preferably integrally formed with the bottom portion.

Figures 9A, 9B, 9C, 10:
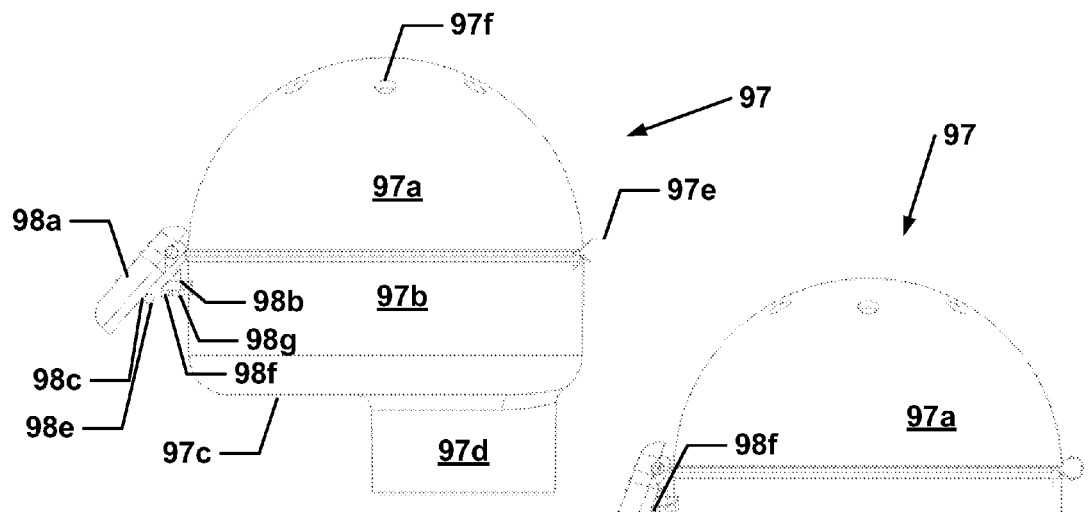
FIGS. 9a-9c are side views of a loft that includes a self-locking latch structure.
FIG. 10 is a perspective view of the loft of FIGS. 9a-9c and a support in accordance with one embodiment of the present invention.

FIGS. 9a-9c are side views of a loft that includes a self-locking latch structure. Loft 97 provides easy access to the resident animal and is in itself a pet habitat. The resident animal may choose to climb from the floor of base 20 through climbing structure 91 to platform 94 and specifically walk in the platform to an area disposed underneath a port. From there, the animal can climb through, if present, one more modular extensions or climbing structures, such as the ones taught in Ser. No. 12/880,301 into stem 97d. The animal can the stay on floor 97c. The carer can open the top via a latch 98a disposed on top portion 97a and a catch 98b disposed on bottom portion 97b and remove the resident animal for petting. The resident animal can then be returned via to the loft.

However, since carers are often children who do not pay attention as well as adults, they may inadvertently leave latch 98a unlocked due to inattention and permit the resident animal to escape by lifting top portion 97a relative to bottom portion 97b. Thus, latch 98a and catch 98b comprise a self-locking structure.

Therein, latch 98a comprises a strike member 98c, i.e., a cam, that extends substantially orthogonally to a latch member 98d, i.e., a face plate of the latch that has a plurality of ribbings for easy handling. Strike member 98c includes a bulbous end portion 98e. Catch 98b comprises a double catch comprising a first catch section 98f and a second catch section 98g that are spaced from each other in the direction that strike member 98c travels. The first catch section has a lesser bump than the second catch section with respect to a base. Latch member 98d is suitably weighted so that when top portion 97a falls down, strike member 98c by gravity alone catches at least first catch section 98f, i.e., bulbous end portion 98e has slid over catch section 98f, as illustrated in FIG. 9b. In this way, the loft is locked automatically and the resident animal cannot escape. The member 98d can be manually depressed causing strike member 98c to lock against second catch section 98g, as illustrated in FIG. 9c, and locking more securely locking the latch.

The loft can be placed in an open position when top portion 97a is hingedly moved away from the bottom portion 97b. When the top portion is released from the open position, the latch engages the catch so that the strike member slides over the first catch section by the force of gravity and causing the strike member to slide over the first catch section. In this way, the self locking feature of the latch and catch locking system will cause the loft to be locked even an inattentive child has not pro-actively closed latch and catch.

In accordance with one or more embodiments of the present invention, one or more latches disposed to connect the base and extensions, the door to the extension, and/or the second entertainment housing portion to the first entertainment housing portion are configured to have the self-locking latch structure of latch 98a and catch 98b.

FIG. 10 is a perspective view of the loft of FIGS. 9a-9c and a support in accordance with one embodiment of the present invention. A support 99 comprises a receiving member into which a stem, such as stem 97d is inserted and a plurality of splayed support members 99a disposed in the front and/or to the rear that keep loft 97 from tipping.

In use, when small animal habitat 10 or 100 is being cleaned, the resident animal can be secured in loft 97. Loft 97 with or without the resident animal inside can then be placed on support 99. the resident animal can then be placed inside. The resident animal is held securely without the loft tipping over. The small animal habitat can then be cleaned without the resident animal being present.

While the invention has been described in conjunction with specific embodiments, it is to be understood that many alternatives, modifications and variations will be apparent to those skilled in the art in light of the foregoing description.

What is claimed is:

1. A small animal habitat comprising:
   a base,
   a wall extension;
   a roof;
   an animal entertainment device distal from the base and disposed under the roof, wherein the animal entertainment device moves from a first position to a second position along a pair of rails;
   a platform spaced from the base providing access to the entertainment device;
   a support extending vertically upward from the base and supporting the platform, the support comprising a climbing structure; and
   a first animal traversable path from the base to the animal entertainment device, the path comprising a first substantially vertical climb on the climbing structure from the base to the platform, a first substantially horizontal traverse on the platform, and a further climb over an edge of the platform into the animal entertainment device.

2. The small animal habitat of claim 1, wherein the platform has a bathtub shape in cross-section.

3. The small animal habitat of claim 1, wherein the climbing structure is disposed in an interior space of the support.

4. The small animal habitat of claim 1, wherein the platform comprises a first portion and a second portion, the first portion being disposed along a traversable length of the animal entertainment device.

5. The small animal habitat of claim 4, further comprising a port in the roof, the second portion being disposed to reach the port.

6. The small animal habitat of claim 1 further comprising a port in the roof; and
   a second animal traversable path from the base to the port comprising the first substantially vertical climb on the climbing structure from the base to the platform, a second substantially horizontal traverse on the platform, and a second substantially vertical climb from the platform to the port.

7. The small animal habitat of claim 1, wherein the animal entertainment device is an animal powered rotatable wheel.

8. The small animal habitat of claim 1, wherein the roof comprises a longitudinal domed portion proximate to a portion of the platform to permit ingress and egress from the entertainment device.

9. The small animal habitat of claim 1, further comprising a first and second housing portion for the entertainment device.

10. The small animal habitat of claim 9, wherein the first and second housing portion are secured to each other using a latch and catch system.

11. The small animal habitat of claim 1, wherein the platform is supported only by the support.

12. A small animal habitat comprising:
    an interior space defined by a base, an extension wall, and a roof;
    a platform distal from' the base and disposed in the interior space;
    an animal entertainment device and disposed in the interior space and proximate to the platform, wherein the animal entertainment device is an animal powered rotatable wheel that moves from a first position to a second position along a pair of rails;
    a climbing structure; and
    a first animal traversable path from the base to the animal entertainment device comprising a first substantially vertical climb on the climbing structure from the base to the platform, a first substantially horizontal traverse on the platform, and a further climb over an edge of the platform into the animal entertainment device.

13. The small animal habitat of claim 12, wherein the first animal traversable path further comprises a further climb over an edge of the platform into the animal entertainment device.

14. The small animal habitat of claim 12, further comprising
    a port in the roof; and
    a second animal traversable path from the base to the port comprising the first substantially vertical climb, a second substantially horizontal traverse on the platform, and a second substantially vertical climb from the platform to the port.

15. A small animal habitat comprising:
    a base, an extension wall, and a roof defining an interior space;
    a platform distal from the base;
    an animal entertainment device proximate to the platform, wherein the animal entertainment device is an animal powered rotatable wheel that moves from a first position to a second position along a pair of rails; and
    a first animal traversable path from the base to the animal entertainment device comprising a first substantially vertical climb and a first substantially horizontal traverse on the platform;
    wherein the roof comprises a longitudinal domed portion proximate to a portion of the platform to permit ingress and egress from the entertainment device.

16. The small animal habitat of claim 15, wherein the platform is supported by a single tubular support.

17. The small animal habitat of claim 15, further comprising a second animal traversable path from the base to the port comprising the first substantially vertical climb, a second substantially horizontal traverse on the platform, and a second substantially vertical climb to the port.

18. The small animal habitat of claim 12, wherein the roof comprises a first portion that is removable.

* * * * *